United States Patent

[11] 3,622,910

[72] Inventors Arthur R. Kantrowitz
 Arlington;
 Donald A. Leonard, Stoneham, both of Mass.
[21] Appl. No. 777,373
[22] Filed Nov. 20, 1968
[45] Patented Nov. 23, 1971
[73] Assignee Avco Corporation
 Cincinnati, Ohio

[54] DYNAMIC CONVECTIVE COOLED LASER
 5 Claims, 6 Drawing Figs.
[52] U.S. Cl. ................................................. 331/94.5,
 313/11, 313/12, 313/45, 313/220, 313/231, 315/111
[51] Int. Cl. ................................................. H01s 3/04
[50] Field of Search ...................................... 331/94.5
 US P, 94

[56] References Cited
 UNITED STATES PATENTS
2,851,652 9/1958 Dicke ........................... 331/94

2,995,711 8/1961 Peter et al. .................... 331/94
3,427,564 2/1969 Okaya et al. .................. 331/94.5
3,466,566 9/1969 Patel ............................. 331/94.5
3,496,489 2/1970 Lin ................................ 331/94.5

OTHER REFERENCES

Shumaker, " The Review of Scientific Instruments," Jan. 1961, pp. 65–67.
Gerry et al., " Space Aeronautics," July 66, pp. 92–100.
Leonard, " Applied Physics Letters," 1 July 65, pp. 4–6. 331–94.5

Primary Examiner—Roy Lake
Assistant Examiner—Darwin R. Hostetter
Attorneys—Charles M. Hogan and Melvin E. Frederick ABSTRACT: An electrically pumped gas laser wherein at least one wall of the laser cavity comprises a plurality of openings to receive heated gas from the lasing region and direct the gas to a cooling region, thereby effecting cooling of such gas.

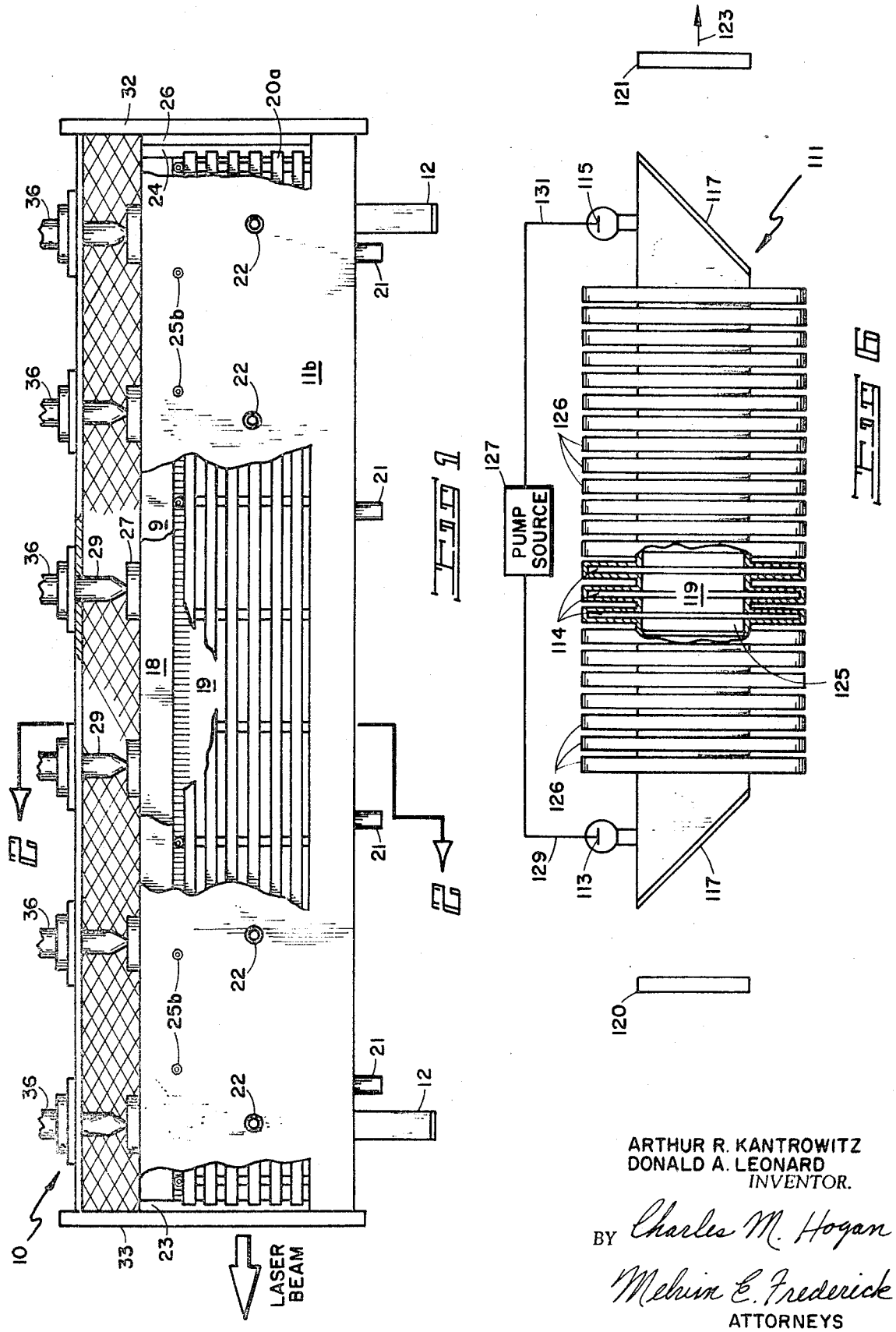

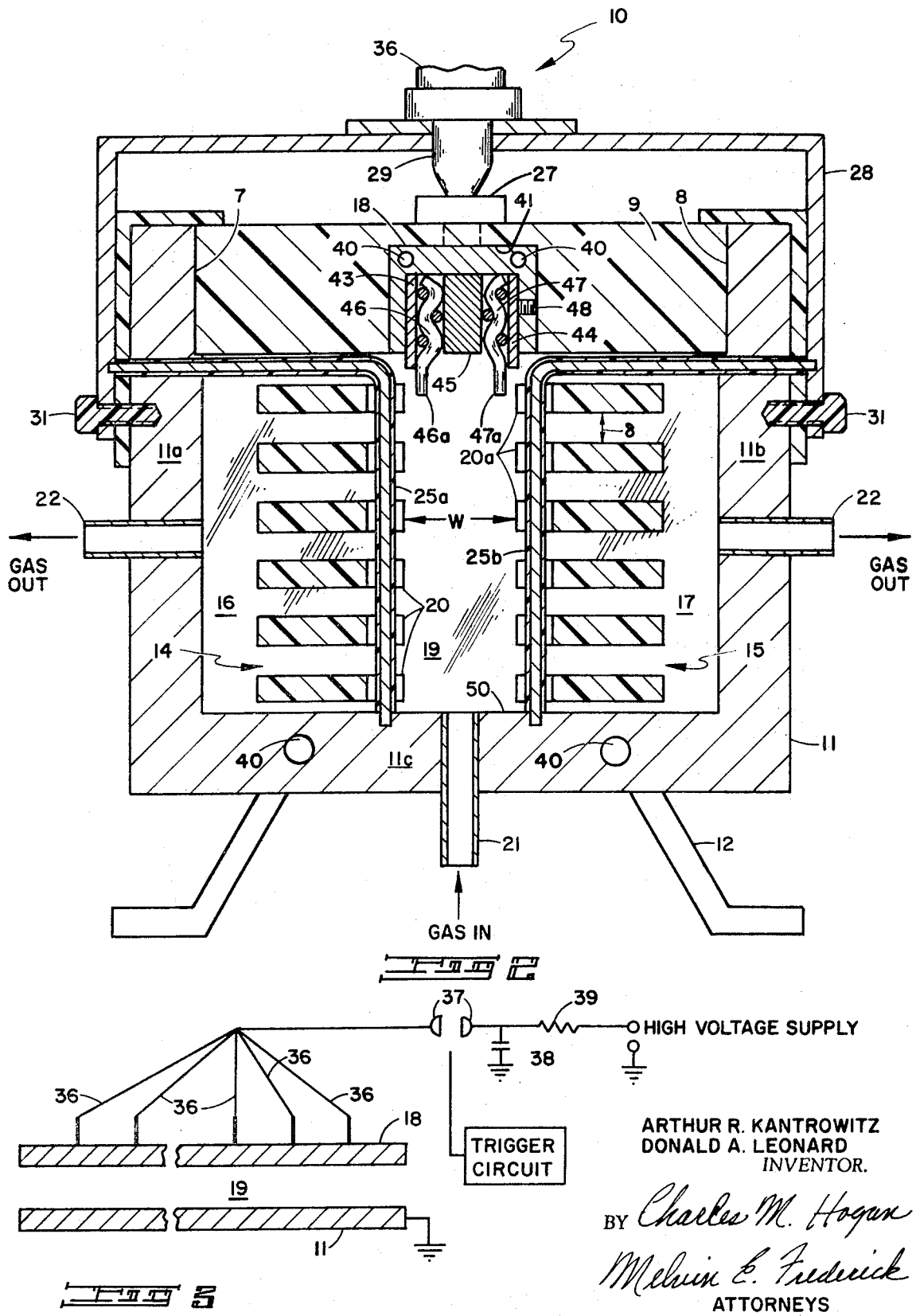

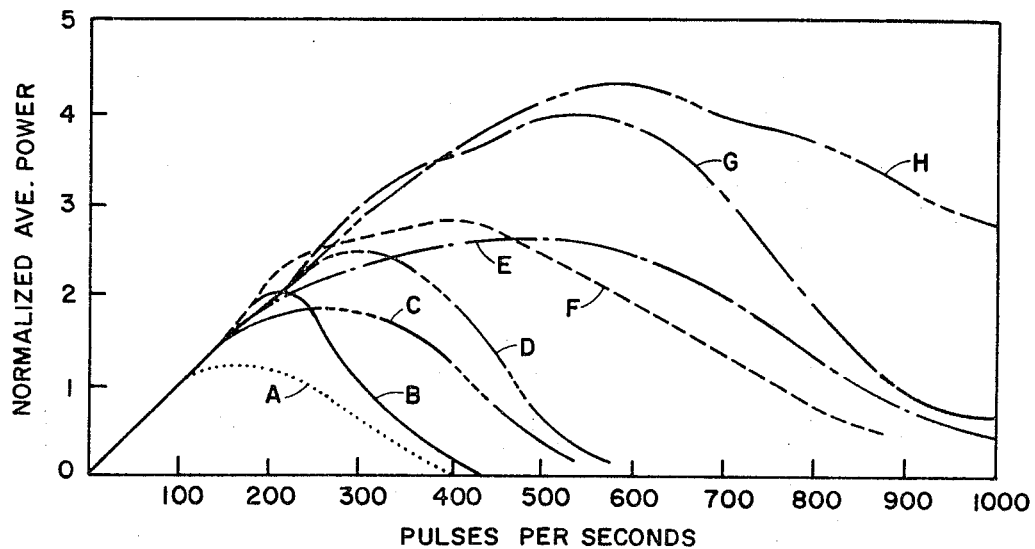
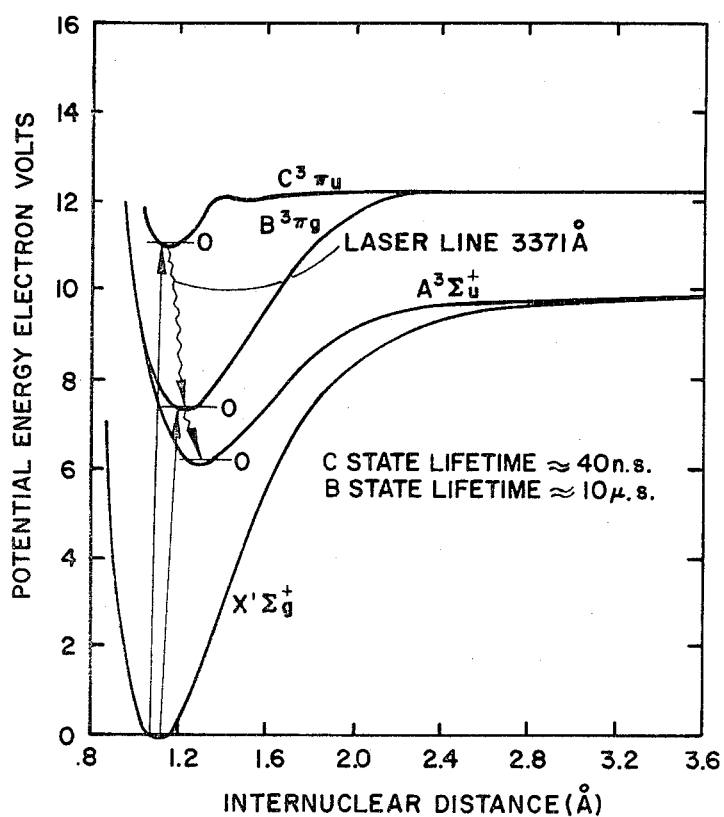

DYNAMIC CONVECTIVE COOLED LASER

This invention relates to a device for producing light at high-output power levels and in particular to a laser device which employs a gas discharge created by a pulsed electric field.

A common problem and limitation of all lasers, whether solid, liquid, or gas, is the removal of waste heat or energy from the device. While details will vary with individual laser systems, the performance of a particular laser device ultimately depends on the efficient removal of waste heat.

While the present invention is disclosed in connection with a specific gas laser system, it is to be understood that it may be used with all pulsed gas lasers.

It is a general object of the present invention to overcome many of the objectionable features found in prior art gas lasers by providing a laser device which is both simple and inexpensive to manufacture and which has an increased efficiency over prior known devices.

Another object of the invention is to provide a laser device for producing light at high-output power levels which employs a unitary element as the gas medium.

A further object of the invention is to provide a gas laser which utilizes the otherwise waste laser energy to assist in cooling the device.

A still further object of the invention is to provide a gas laser which utilizes the otherwise waste laser energy to increase the overall performance of such devices.

A still further object of the invention is to provide an improved pulsed gas laser.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

FIG. 1 is a side elevational view partially in section of an embodiment of the invention;

FIG. 2 is a sectional view taken along lines 2—2 of FIG. 1 showing elements of the invention in detail;

FIG. 3 is a schematic view showing the electric circuit employed in the device of FIG. 1;

FIG. 4 is a partial energy level diagram for molecular nitrogen showing the relevant energy levels for the 3371 A. second positive laser;

FIG. 5 is a graphic representation of normalized average laser output power versus pulse repetition rate for a conventional crossed-field laser and crossed-field lasers in accordance with the invention; and FIG. 6 is a schematic diagram, partially in cross section, showing the basic features of a conventional pulsed gas laser incorporating the present invention.

The crossed-field geometry type of laser particularly suited for use with the present invention is described in patent applications Ser. No. 536,094 filed Mar. 21, 1966, and Ser. No. 743,867 filed July 10, 1968, to which reference is made. See also the article entitled "The 5401A. Pulsed Neon Laser" by Donald A. Leonard, published in IEEE Journal of Quantum Electronics, Volume QE-3, Mar. 1967, pp. 134-135.

In the aforementioned prior art, crossed-field type of laser power flows from a capacitor through low-inductance transmission lines or the like to an upper electrode which is typically a single-metal strip running the length of the active region. A U-shaped channel serves both as a structural support of the device and as the other electrode. The discharge takes place between dielectric sidewalls which support the upper electrode. On the short time scales required by such lasers, the initial current distribution is essentially inductance controlled and when operating normally and not subject to arc spots or hot spot failure and the like, extremely uniform discharges are produced along the entire length of the active region.

Referring now to FIGS. 1 and 2, there is shown a laser device generally designated by the numeral 10 and having a base 11 mounted on a pair of supports 12. The base 11 is a U-shaped channel member (see FIG. 2) fabricated from any suitable conductive material, such as aluminum.

The base member 11, having two-leg portions 11a–11b and a bight portion 11c interconnecting the leg portions as shown in FIG. 2, serves both as a structural member as is evident from FIG. 1 and an electrode as schematically depicted in the circuit shown in FIG. 3.

The leg portions 11a and 11b are provided with recesses 7 and 8 to receive and support a top member 9 fabricated of a suitable insulating material such as quartz, Pyrex, Plexiglass, or the like. The top member 9 is provided with a centrally located groove in its inner surface to receive the metal upper electrode member 18, more fully described hereinafter.

One or more gas inlet tubes 21 are provided in the bottom surface of the base 11 and gas outlet tubes 22 are provided in the leg portions of the base member 11 and define gas passages through the base to the interior of the device comprising a centrally located active region 19 in which the lasing action takes place, cooling regions 14 and 15 on respectively opposite sides of the active region 19 for receiving gas therefrom and plenum regions 16 and 17 between respectively the cooling regions 14 and 15 and the leg portions 11a and 11b of the base 11.

Since the current distribution is essentially inductance controlled as noted above, suitably insulated conductors 25a and 25b spaced along the length of the active region 19 are provided such that a discharge path through the active region 19 is the path of lowest inductance and therefore insure that the discharge occurs entirely in the active region 19 and not elsewhere such as, for example, between the upper electrode 18 and one of the leg portions 11a or 11b. This may be achieved by connecting one end of the conductors to the base 11 along the lower outer edges of the active region 19. The conductors extend upwardly along the sides of the active region to about the uppermost portion of the active region. The conductors are then bent and pass through the leg portions to complete the electrical circuit (more fully described hereinafter) with the cover 28, which is insulated from the base 11. Alternatively, the conductors may be brought through the top member 9. Where a single expanded sidewall configuration is utilized (essentially one-half of that shown in FIG. 2) the remaining sidewall may be in accordance with prior art devices since a return circuit immediately adjacent the side of the active region will be automatically provided.

A pair of panels 23 and 24, one disposed adjacent each end of the base 11, serve to seal the ends of the base 11. The panels 23 and 24 are transparent to light at the wavelength of radiation produced and thus serve as windows for the laser beam emanating from the device. The panels 23 and 24 may be fabricated from quarts or other well-known material having the desired properties as stated.

It should here be noted that the active region 19 is generally maintained at a pressure other than atmospheric such as, for example, about 25 torr, during operation of the laser device 10. As is obvious, therefore, it is necessary to pressure seal the interior of the device to ambient. Accordingly, the various contact surfaces between the top member 9, base 11, the upper electrode member 18, and the panels 23 and 24 are sealed by a suitable cement or sealant material to provide at least a relatively gas-tight enclosure which includes the active region 19.

Panels 23 and 24 (or alternatively, similar support members) are provided with two parallel series of recesses to fixedly receive the extreme ends of preferably electrically nonconductive cooling vanes or members 20 and 20a which extend the length of base 11. As shown in FIGS. 1 and 2, a plurality of parallel fins or vanes spaced one from another are provided in each cooling region, the inmost edge of the vanes effectively defining the sides of the active region 19. The vanes are fabricated of a suitable insulating material such as quartz, glass, or the like. The vanes may be made of metal where this will not result in electrical breakdown or arcing. As more fully described hereinafter, the vanes are spaced a distance one from another, of a composition, width, thickness, and orientation, and provided with cooling where necessary, whereby during an excitation pulse the gas heated thereby in the active region is driven, due to the resulting increase in pressure, into or between the spaces between the vanes and thereby cooled as a result of being exposed to a large cooling surface.

Adjacent panel 24 there is disposed a mirror 26 having its reflective surface in contact with the panel 24. The mirror 26 may be a first surface silvered mirror and may be cemented to the panel 24 along its edges or held in place by any other suitable means leaving the reflective surface unobstructed. Alternatively, panel 24 may comprise the mirror.

The electrode member 18 is provided with a plurality of jack receptacles 27 which pass through the top member 9 and are equally spaced along the length of the electrode member. A cover member 28 fabricated of open metal grill work or other suitable conductive material is provided with a plurality of jacks 29 spaced for engagement with the jack receptacles 27 when the cover is positioned on the base 11. The cover member 28 may be removably attached to the base 11 as by electrically nonconductive bolts 31.

With the cover 28 in place, the end plate 32 is attached adjacent the closed end of the laser device 10 and a port plate 33 is fastened to the open end of the laser device.

The port plate 33 has provided therein an elongated opening in alignment with the active region 19 and substantially equal in area to the cross section of the active region.

In FIG. 3 there is schematically shown means for applying a pulsed electric field across the active region 19.

Referring now to FIG. 3, taken in connection with FIGS. 1 and 2, it will be noted that each of the jacks 29 are connected through the cover member 28 to a plurality of coaxial cables 36. The cables 36 may be connected through a triggered spark gap 37 or thyratron to a capacitor means 38, generally a capacitor bank. The energy for the capacitor means 38 is provided by a high-voltage supply which is placed in series with a current limiting resistor 39. The coaxial cables 36 are grounded to the cover member 28 and serve to complete the circuit through the cover member and the base 11 to the gas in the cavity 19.

The spark gap 37 is triggered by a pulse circuit which may be a commercially available device well known in the art. With the device shown, the circuit parameters are typically L=0.02 microhenries, C=0.03 microfarads, with an initial capacitor voltage of 15 to 25 kilovolts.

Returning now to the electrode member 18, it is provided along its length with passages 40 for receiving a coolant such as water. The electrode member 18 is also provided along its length with a recess 41 in its lower surface in register with its active region 19. Disposed within recess 41 are outer spacer members 43 and 44, a center spacer member 45, a screen member 46 disposed between and separating spacers 43 and 45, and a screen member 47 disposed between and separating spacers 44 and 45. The outer spacers 43 and 44 may extend slightly below the lower surface of electrode member 18 and function as spacers to maintain the screen members away from the vanes a short distance. Set screws 48 spaced along the length of electrode member 18 are provided to engage one of the outer spacer members and thereby securely lock the spacers and screen members in the electrode member 18. If desired, to improve heat transfer from the screen members, they may be soldered into groove 41. Relatively closely spaced and elongated projections 46a and 47a, such as for example free standing wires or wirelike projection, extend past the surface of the electrode member 18 and into the active region 19. The mean distance between the extreme ends of these projections and surface 50 of base 11 define the electrode spacing. While the length of the projections intermediate the ends of region 19 are preferably the same length, those immediately adjacent the ends of region 19 should gradually decrease in length to prevent high electric field concentrations at these locations. Satisfactory projections providing continuous operation in excess of 200 hours have been fabricated from No. 32 gauge, 30×30 stainless steel wire screen with six strands of horizontal wire removed to provide projections approximately one-eighth inch in length.

The operational surface of electrode 18 (and surface 50 if desired) exposed to the active region, preferably are uniformly rough on a scale small compared to both the effective interelectrode spacing and electrode width so that currents originating from adjacent rough points or projections will diffuse and merge together and thereby produce a uniform current distribution in the body of the active region, the scale and character of the roughness or projections being such that they are not substantially perturbed or distorted by imperfection, heating and/or temporary arc spots or pitting that may from time to time occur under discharge conditions. The preceding provides stabilization of the current distribution in the discharge channel and insures that small local current concentrations that may occur from time to time do not produce significant local pits or hot spots on the electrodes which in turn cause a current concentration at that spot. For a more complete discussion, reference is made to the aforementioned patent application Ser. No. 743,867.

Degradation of the performance of a laser as described in the aforementioned patent applications at high repetition rates is determined by the temperature of the nitrogen gas prior to the electrical pulse and the concentration of atoms, ions, and vibrationally or electronically excited metastables. The effect of increased temperature is to broaden the transition and lower the gain per unit wavelength interval. Both doppler broadening and increased rotational excitation can contribute to the lower gain. Since the pulsed nitrogen laser is self-terminating on a time scale which precludes a resonant cavity mode of operation, the efficient extraction of laser energy depends on a super radiant operation which is extremely gain-sensitive.

Increasing the concentration of vibrationally or electronically excited molecules reduces the population inversion in the active region because the electronic impact cross sections from levels other than the lowest vibrational level of the ground electronic state are in general not as favorable for exciting upper laser level "C" states relative to lower laser level "B" states. This can be inferred using Franck-Condon arguments from the $N_2$ energy level diagram shown in FIG. 4. High degrees of ionization are also undesirable prior to the application of the high-voltage electrical excitation pulse since the electron density must be low enough so that the inductance and voltage limited input energy when shared among all of the electrons in the active region results in an electron temperature suitable for preferential excitation of upper laser levels, usually 3 to 5 ev. or higher.

For a given input power, the gas temperature of a static pulsed nitrogen laser is determined both by diffusion cooling of the gas to the laser sidewalls and the rate of heat transfer through the sidewalls to ambient. The building up of atoms, ions, and metastables can be suppressed by catalytic sidewalls if volume recombination and deexcitation processes are inadequate.

Prior art pulsed nitrogen lasers as shown and described in the aforementioned patent applications operate efficiently on a single shot basis in a crossed-field discharge geometry. This configuration provides a low-inductance geometry with which high-electric fields can be generated over a large volume with moderate operating voltages. This rectangular geometry also possesses a desirable aspect ratio of surface area to diffusion distance for efficient cooling by diffusion of heat from the volume of the gas to the channel sidewalls.

When such a prior art crossed-field pulsed nitrogen laser having dimensions of, for example, about one-eighth by one inch in cross section is repetitively pulsed, the power output of each pulse remains essentially constant until repetition rates of somewhat above 100 pulses per second are achieved. However, at higher rates, the power output rapidly falls to zero.

The decrease in output power above 100 pulses per second has been found to be consistent with a diffusion limitation on the heat transfer. If the characteristic cooling time $t$ is set equal to the distance for diffusion divided by the diffusion coefficient for $N_2$, for a laser having the above-noted active region of one-eighth by one inch, then the characteristic cooling time $t$ equals $2.2\times10^{-3}$ seconds. This time is approximately equal to the interpulse time at 400 pulses per second at which pulse rate the laser power output is very much reduced.

A requirement for optimum current density precludes arbitrary decreases in the channel width, which if possible would of course allow large decreases in the effective diffusion time. A 0.3 centimeter channel width, as used in the above estimate of diffusion times $t$ is a near optimum current width with respect to current density.

At the termination of the electrical pulse which excites the pulsed nitrogen laser (approximately 100 nanoseconds in duration) the nitrogen gas is left in a state of relatively high pressure. Assuming that most of the input energy does not remain in nonequilibrium internal degrees of freedom for a significant amount of time, in a typical situation the absolute translational temperature of the nitrogen gas is raised a factor of five by the electrical exciting pulse.

Under adiabatic circumstances, with no external heat transfer, a factor of five increase in temperature causes a corresponding factor of five increase in pressure. In accordance with the invention, it is this large increase in pressure that is used to move heated gas out of the active region, between the cooling vanes, thus accomplishing self-induced, high-speed convective cooling. Accordingly, an important feature of the invention is to use the energy deposited in the gas during an excitation pulse to increase the cooling rate between pulses.

The size and spacing of the means which define the cooling regions are not critical and may vary within reasonable limits. However, the height dimension $\sigma$ of each cooling region (see FIG. 2) preferably is equal to or less than the width dimension $\omega$ of the active region to facilitate the flow of gas from all parts of the active region into cooling regions in as short a time as is reasonably possible. In an embodiment, for example, as shown in FIG. 2, the distance $\sigma$ between vanes and the width of the vanes are preferably selected such that the boundary layers of gas flowing between vanes do not fully close. If the boundary layers close, the flow will be choked. The thickness of the vanes (or material between cooling regions) is preferably as small as possible consonant with strength, electrical and/or cooling requirements.

For purposes of convenience, hereinabove the major dimension of the active region has been shown and described as being normal to the effective surfaces of the electrodes. It will be understood, however, that in the event this major dimension of the active region is disposed parallel to the effective surfaces of the electrodes (parallel to surface 50, for example) the electrodes may be provided with or define passages (not shown) which function in substantially the same manner to provide substantially the same results as vanes 20 and 20a, as and for the purposes set forth herein.

FIG. 5 shows data obtained with a conventional crossed-field laser substantially as shown and described in the aforementioned patent application, Ser. No. 743,867, with the exception that one sidewall only was replaced with a plurality of vanes substantially as shown in FIGS. 1 and 2.

The data is displayed in FIG. 5 as a plot of average laser output power normalized to 100 pulses per second as a function of pulse repetition rate for various configurations. For purposes of comparison, curve A shows the performance of a wholly conventional diffusion channel, i.e., without wall expansion operating at a pressure of 25 torr of $N_2$. It is significant to note that curve A peaks at a power of 1.2 at a pulse repetition rate of 200 pulses per second and falls to essentially 0 at 400 pulses per second.

Curve B shows the performance of a channel, one wall of which is replaced with ¼-inch thick vanes separated by ¼-inch openings, 6 inches in depth. Operation of curve B is at 25 torr of $N_2$ with a slow flow into and out of the electrode region.

Curve C shows the performance of the same channel as used for curve B, with a change in operating pressure to 15 torr of $N_2$ with a slow flow into and out of the electrode region.

Curve D shows the performance of the same channel as used for curve B, operating at 25 torr with the addition of a relatively slow speed (1 ft./sec.) pumping on the ¼-inch openings between the vanes.

Curve E shows the performance of a channel, one wall of which is replaced with ⅛-inch thick vanes separated by ⅛-inch openings, 6 inches in depth. Operation of curve E is at 25 torr with a 1 ft./sec pumping on the ⅛-inch openings between the vanes.

Curve F shows the performance of the same channel as used for curve E with a change in operating pressure to 15 torr of $N_2$ with again a 1 ft./sec. pumping on the ⅛-inch openings between the vanes.

Curve G shows the performance of the same channel as used for curve E with the addition of a ½-inch wide plenum running the length of the vanes into which the openings between the vanes are connected. The operation is 25 torr with the same flow as in curve E now applied to the plenum.

Curve H shows the performance of the same apparatus as used for curve G with the exception of a change in operating pressure to 15 torr.

As will now be apparent, convective flow in a gas laser in accordance with the invention is provided by utilizing pressure pulses induced by the waste energy of the pulsed laser itself as and for the purpose disclosed hereinabove. If a convective flow substantially wholly within the device is desired, as, for example, by causing gas in the active region 19 (see FIG. 2) to flow in a clockwise direction through cooling region 15 into a single plenum region (plenum regions 17 and 16 interconnected one to another for example), through cooling region 14 and back into the active region 19, pneumatic rectification should be provided to more effectively provide a one-way gas flow. Mechanical flapper valves may in principle be employed for this purpose. However, since pulse repetition rates of the order of 1,000 to 10,000 pulses per second are principally of interest and mechanical flapper valves are generally used at rates of the order of 100 pulses per second and less, the use of such valves are not recommended.

A more satisfactory approach is the provision of nozzlelike openings conventionally directed in the direction of flow from the active region and the provision of sharp-edged openings at, for example, the opposite side of the active region through which it is desired that cooled gas enter the active region. On the other hand, rectification may be provided by taking advantage of variation of viscosity and temperature and requiring that hot gas flow out of the active region and that cold gas flow into the active region. By cold gas is meant gas at a temperature considerably less than that of the gas flowing out of the active region. Such an arrangement may be provided by employing an array of small passages on the gas inlet side of the active region, of a size small enough so that boundary layers close as the flow passes through them. The other or gas inlet side of the active region is provided with openings of a size sufficiently greater than those on the gas inlet side so that a pressure wave may freely travel through them, cooling being provided by passage of the gas through the larger openings and/or in a cooling region or regions. In such an arrangement cooled gas will enter and traverse the small passages easier than a hot gas because the viscosity of the cooled gas is less than that of the hot gas. Accordingly, there will be provided a net flow of gas from the cooling region through the small passages and into the active region.

Attention is now directed to FIG. 6 which shows a gas discharge laser comprising a cylindrical gas discharge chamber 111 having mounted therein a cathode 113, an anode 115 and a pair of optically transparent Brewster-type windows 117 disposed at opposite ends of the chamber 111. Disposed within the chamber 111 is a gaseous lasing material 125 such as argon, krypton, xenon, neon, or the like. The chamber 111 is provided with a plurality of consecutive hollow cylindrical ring-like projections 126 extending substantially its active length. Each projection 126 defines a radially extending cooling region 114, in communication with the active region 119 of chamber 111. The cooling regions 114 defined by the projections 126 operate in the same manner to produce the same results as the cooling regions described in connection with FIG. 2. Further, if desired, plenum regions (not shown) may be provided in communication with the cooling regions 114.

The discharge chamber 111 is disposed within an optical frequency resonant cavity including a dielectric coated mirror 120 which may or may not be substantially nontransmissive and a partially transmissive dielectric coated mirror 121 through which coherent light energy generated by laser action (represented by arrow 123) is projected. Also shown is a conventional type pump energy source 127 coupled to the cathode 113 and anode 115 by a cathode lead 129 and an anode lead 131 respectively.

The pump energy source 127 in this example produces energy sufficient to pump the lasing material 125 to its singly ionized state whereby radiative transitions occur in this region and produce electromagnetic energy in the visible frequency range. The pump energy necessary to achieve the transitions in any of the ionized states varies with the particular element used as the lasing material 125 but will always be of a value above a first ionization potential of the gaseous lasing material 125.

For a noble gaseous lasing material, the particular pump energy source 127 shown in FIG. 6 may be a pulse-type providing a current density approximately 100 to 200 amps/cm.$^2$ and having a pulse width of 0.5 $\mu$sec. to 7 $\mu$sec., a repetition rate of 70 c.p.s. to 2 kc., a maximum current capability of 40 amps and provides a continuously variable voltage of 0–20 kilovolts.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. In a laser device for producing light comprising means defining an elongated active region having a longitudinal axis; a gas in said active region having at least two energy levels above the ground energy level in which the net excitation rate for the higher of the two upper levels is greater than the net excitation rate for the lower of the two energy levels; and electrode means communicating with said active region for applying a pulsed electric field across said active region to produce an inversion between the two upper energy levels of said gas, the improvement comprising:
   a. electrically nonconductive wall means defining at least substantially one side of said active region and extending substantially the length of said active region, said wall means defining a plurality of recesses spaced one from another along the length of said active region and extending outwardly away from said active region, said recesses each having one end in communication with said active region and of a size and configuration that the boundary layer of gas heated and flowing into said recess from said active region as a result of the application of each pulse of said electric field does not fully close, each said recess having at least a size and configuration to effect cooling of gas received from said active region and return of at least part of said cooled gas to said active region upon termination of each said pulse of said electric field.

2. The combination as defined in claim 1 and additionally including electrode circuit means coupled to said electrode means for applying a voltage across said electrode means, said electrode circuit means including an electrically conductive path adjacent at least one side of said active region.

3. The combination as defined in claim 2 wherein said wall means comprises a plurality of electrically nonconductive members spaced one from another.

4. The combination as defined in claim 1 additionally including means defining a plenum chamber, said recesses being disposed between said plenum chamber and said active region and providing communication therebetween.

5. In a laser device for producing light comprising means defining an elongated substantially optically nonresonant active region having a longitudinal axis; means for supplying to said active region a gas having at least two energy levels above the ground energy level in which the net excitation rate for the higher of the two upper levels is greater than the net excitation rate for the lower of the two energy levels during electric discharge in said gas, and means including electrode means communicating with said active region for applying a pulsed electric field across said active region normal to said longitudinal axis to produce an inversion between the two upper levels of said gas, the improvement comprising:
   a. electrically nonconductive first wall means defining at least one side of said active region, said first wall means further defining a plurality of passages spaced one from another along the length of said active region and communicating with said active region;
   b. electrically nonconductive second wall means defining a side of said active region opposite the said one side, said second wall means further defining a plurality of passages spaced one from another along the length of said active region and communicating with said active region; and
   c. means including means defining a plenum chamber communicating with the passages of said first and second wall means whereby during application of each pulse of said electric field gas in said active region flows out of said active region substantially only through the said first wall means, through said plenum chamber and back into said active region through substantially only the said second wall means.

* * * * *

PO-1050
(5/69)

UNITED STATES PATENT OFFICE
CERTIFICATE OF CORRECTION

Patent No. 3,622,910            Dated November 23, 1971

Inventor(s) Arthur R. Kantrowitz and Donald A. Leonard

It is certified that error appears in the above-identified patent and that said Letters Patent are hereby corrected as shown below:

Column 1, line 60, after "QE-3," insert --No. 3--; Column 5, line 7, for "2.2 x 10'7E'3", read --$2.2 \times 10^{-3}$--; Column 6, line 20, after "is" insert --at--; and Column 6, line 57, for "inlet", read -- outlet--.

Signed and sealed this 29th day of August 1972.

(SEAL)
Attest:

EDWARD M.FLETCHER,JR.            ROBERT GOTTSCHALK
Attesting Officer                  Commissioner of Patents